United States Patent
John et al.

(10) Patent No.: US 9,584,522 B2
(45) Date of Patent: Feb. 28, 2017

(54) MONITORING NETWORK TRAFFIC BY USING EVENT LOG INFORMATION

(75) Inventors: Pramod John, Hayward, CA (US); Yingxian Wang, San Jose, CA (US); Ramachandran V. Marti, Sunnyvale, CA (US); Maxine R. Erlund, Cupertino, CA (US)

(73) Assignee: VMware, Inc., Palo Alto, CA (US)

( * ) Notice: Subject to any disclaimer, the term of this patent is extended or adjusted under 35 U.S.C. 154(b) by 1243 days.

(21) Appl. No.: 11/398,013

(22) Filed: Apr. 4, 2006

(65) Prior Publication Data

US 2006/0179140 A1    Aug. 10, 2006

Related U.S. Application Data

(63) Continuation-in-part of application No. 11/042,842, filed on Jan. 25, 2005.

(60) Provisional application No. 60/548,047, filed on Feb. 26, 2004.

(51) Int. Cl.
*G06F 15/173* (2006.01)
*G06F 11/30* (2006.01)
*H04L 29/06* (2006.01)

(52) U.S. Cl.
CPC .......... *H04L 63/102* (2013.01); *H04L 63/105* (2013.01)

(58) Field of Classification Search
CPC ............................ H04L 63/102; H04L 63/105
USPC ................ 709/203, 223, 224; 715/3; 726/22
See application file for complete search history.

(56) References Cited

U.S. PATENT DOCUMENTS

| | | | |
|---|---|---|---|
| 5,774,650 A | 6/1998 | Chapman et al. | |
| 5,787,253 A * | 7/1998 | McCreery et al. | 709/231 |
| 6,219,706 B1 | 4/2001 | Fan et al. | |
| 6,233,577 B1 | 5/2001 | Ramasubramani et al. | |
| 6,243,667 B1 * | 6/2001 | Kerr | H04L 45/00 370/379 |
| 6,292,838 B1 * | 9/2001 | Nelson | 709/236 |
| 6,301,658 B1 | 10/2001 | Koehler et al. | |
| 6,317,786 B1 * | 11/2001 | Yamane et al. | 709/224 |
| 6,385,653 B1 | 5/2002 | Sitaraman et al. | |
| 6,466,932 B1 | 10/2002 | Dennis et al. | |
| 6,519,571 B1 * | 2/2003 | Guheen et al. | 705/14 |
| 6,553,428 B1 | 4/2003 | Ruehle et al. | |

(Continued)

FOREIGN PATENT DOCUMENTS

EP    1054529 A2 *  11/2000  ............. H04L 12/26

OTHER PUBLICATIONS

Office Action in U.S. Appl. No. 11/042,842, mailed Feb. 12, 2009.
(Continued)

*Primary Examiner* — Philip Chea
*Assistant Examiner* — Wing Ma

(57) ABSTRACT

A solution is provided for associating network traffic traversing a networked environment according to a selected category item, such as a user name or other network entity identity-related information. The solution includes a collector and a monitor. The collector extracts a user name and a network address from an event log maintained on the networked environment. The monitor receives the network traffic and identifies at least one packet having a network address that matches the extracted network address. After at least one of the packets is identified, the collector associates the identified packet(s) with the extracted user name.

22 Claims, 4 Drawing Sheets

(56) References Cited

U.S. PATENT DOCUMENTS

| | | | |
|---|---|---|---|
| 6,597,661 B1* | 7/2003 | Bonn | H04L 29/06 370/235 |
| 6,622,151 B1 | 9/2003 | Hamamoto et al. | |
| 6,651,099 B1* | 11/2003 | Dietz et al. | 709/224 |
| 6,662,227 B2* | 12/2003 | Boyd et al. | 709/224 |
| 6,678,740 B1 | 1/2004 | Rakib et al. | |
| 6,792,458 B1* | 9/2004 | Muret et al. | 709/224 |
| 6,804,701 B2* | 10/2004 | Muret et al. | 709/203 |
| 6,871,284 B2 | 3/2005 | Cooper et al. | |
| 6,983,379 B1* | 1/2006 | Spalink et al. | 705/10 |
| 7,020,082 B2* | 3/2006 | Bhagavath et al. | 370/230 |
| 7,085,936 B1* | 8/2006 | Moran | 726/5 |
| 7,133,916 B2* | 11/2006 | Schunemann | 709/224 |
| 7,216,162 B2* | 5/2007 | Amit et al. | 709/224 |
| 7,433,943 B1* | 10/2008 | Ford | 709/223 |
| 7,941,827 B2 | 5/2011 | John et al. | |
| 8,024,779 B2 | 9/2011 | John et al. | |
| 2001/0032258 A1* | 10/2001 | Ishida et al. | 709/224 |
| 2001/0039579 A1* | 11/2001 | Trcka et al. | 709/224 |
| 2002/0013841 A1* | 1/2002 | Schweitzer et al. | 709/224 |
| 2002/0029260 A1 | 3/2002 | Dobbins et al. | |
| 2002/0032855 A1 | 3/2002 | Neves et al. | |
| 2002/0110084 A1 | 8/2002 | Butt et al. | |
| 2002/0131764 A1 | 9/2002 | David et al. | |
| 2002/0141393 A1* | 10/2002 | Eriksson | H04W 80/06 370/352 |
| 2003/0061165 A1 | 3/2003 | Okamoto et al. | |
| 2003/0086425 A1* | 5/2003 | Bearden | H04L 12/2697 370/392 |
| 2003/0088664 A1* | 5/2003 | Hannel | H04L 12/2697 709/224 |
| 2003/0135553 A1 | 7/2003 | Pendakur | |
| 2003/0163581 A1* | 8/2003 | Moran et al. | 709/235 |
| 2003/0172143 A1* | 9/2003 | Wakayama | 709/223 |
| 2003/0177383 A1 | 9/2003 | Ofek et al. | |
| 2003/0179777 A1* | 9/2003 | Denton | H04L 12/2697 370/503 |
| 2003/0237002 A1 | 12/2003 | Oishi et al. | |
| 2004/0008972 A1 | 1/2004 | Haken | |
| 2004/0030643 A1 | 2/2004 | Madison et al. | |
| 2004/0049294 A1 | 3/2004 | Keene et al. | |
| 2004/0071130 A1 | 4/2004 | Doerr et al. | |
| 2004/0078391 A1* | 4/2004 | Excoffier et al. | 707/104.1 |
| 2004/0088537 A1 | 5/2004 | Swander et al. | |
| 2004/0117434 A1 | 6/2004 | Bantz et al. | |
| 2004/0117474 A1* | 6/2004 | Ginkel | H04L 41/145 709/224 |
| 2004/0128396 A1 | 7/2004 | Patrick et al. | |
| 2004/0133589 A1 | 7/2004 | Kiessig et al. | |
| 2004/0210771 A1 | 10/2004 | Wood et al. | |
| 2004/0240387 A1* | 12/2004 | Nuzman | H04L 41/145 370/252 |
| 2004/0254919 A1* | 12/2004 | Giuseppini | 707/3 |
| 2005/0050338 A1 | 3/2005 | Liang et al. | |
| 2005/0089048 A1* | 4/2005 | Chittenden et al. | 370/395.54 |
| 2005/0114708 A1* | 5/2005 | DeStefano et al. | 713/201 |
| 2005/0193427 A1 | 9/2005 | John | |
| 2005/0281263 A1* | 12/2005 | Miyamoto | H04L 12/14 370/389 |
| 2006/0123078 A1 | 6/2006 | Mendiola et al. | |
| 2006/0155866 A1* | 7/2006 | Wei | 709/231 |
| 2006/0179140 A1 | 8/2006 | John et al. | |
| 2006/0236370 A1 | 10/2006 | John et al. | |
| 2006/0239273 A1* | 10/2006 | Buckman | H04L 12/14 370/395.41 |
| 2007/0050846 A1* | 3/2007 | Xie et al. | 726/22 |
| 2007/0073633 A1* | 3/2007 | Gallant et al. | 707/1 |
| 2009/0182873 A1* | 7/2009 | Spalink et al. | 709/224 |
| 2010/0281527 A1 | 11/2010 | John et al. | |
| 2012/0167168 A1* | 6/2012 | Orr et al. | 726/1 |
| 2012/0185588 A1* | 7/2012 | Error | 709/224 |

OTHER PUBLICATIONS

Office Action in U.S. Appl. No. 11/042,842, mailed Sep. 21, 2009.
Office Action in U.S. Appl. No. 11/398,028, mailed Sep. 2, 2009.
PacketMotion Product Overview, print date: 2009.
PacketMotion Corporate Overview, print date: 2009.
PacketMotion Interview, print date: 2009.
Office Action in U.S. Appl. No. 11/398,014, mailed Jul. 9, 2009.
Yang, C.S., Liu, C.Y.; Chen, J.H.; Sung, C.Y.; "Design and implementation of secure Web-based LDAP management system"; Information Networking, 2001. Proceedings. 15th International Conference on Jan. 31-Feb. 2, 2001; pp. 259-264.
John Sawyer, "Packet Motion Sentry 2.0.3" Network Computing, Network & System Management, Feb. 13, 2006.
Closing internal User Visibility and Data Governance Gaps with PacketMotion, SANS Institute, Mar. 2008.
Office Action in U.S. Appl. No. 11/042,842, mailed Mar. 8, 2010.
Office Action in U.S. Appl. No. 11/440,663, mailed Mar. 3, 2010.
Notice of Allowance in U.S. Appl. No. 11/398,014, mailed Feb. 23, 2010.
Hassler, V.; "X.500 and LDAP Security: a comparative overview"; Network, IEEE vol. 13, Issue 6, Nov.-Dec. 1999, pp. 54-64.
Claycomb, W.R., Shin, Dongwan; "Threat modeling for virtual directory services"; Security Technology, 2009. 43rd Annual 2009 International Carnahan Conference on Oct. 5-8, 2009, pp. 149-154.
Office Action in U.S. Appl. No. 11/398,014, mailed Jul. 23, 2010.
Notice of Allowance in U.S. Appl. No. 11/398,028, mailed May 12, 2010.
Junaid, M. et al., "Per Packet Authentication for IEEE 802.11 wireless LAN", Multitopic Conference, 2008, INMIC 2008, IEEE International Publication Year: 2008, pp. 207-212.
Huang, C. et al., "One Pass Authentication and Key Arrangement Procedure in Ip Multimedia Subsystem for UMTS", Advanced Information Networking and Applications, 2007. AINA '07, 21st International Conference on Publication Year 2007, pp. 482-489.
Iqbal, M.S. et al., "Packet Level Access Control Scheme for Internetwork Security", Communications, Speech and Vision, IEE Proceedings I, vol. 139, Issue 2. Publication Year: 1992, pp. 165-175.
Office Action in U.S. Appl. No. 11/042,842, mailed Oct. 13, 2010.
Office Action in U.S. Appl. No. 11/440,663, mailed Oct. 13, 2010.
Office Action in U.S. Appl. No. 11/398,028, mailed Nov. 3, 2010.
Notice of Allowance for U.S. Appl. No. 11/398,014, mailed Feb. 28, 2011.
Notice of Allowance for U.S. Appl. No. 11/398,014, mailed Mar. 18, 2011.
Notice of Allowance for U.S. Appl. No. 11/398,028, mailed Jun. 9, 2011.
Office Action for U.S. Appl. No. 11/398,014 mailed Jul. 12, 2010.
Office Action for U.S. Appl. No. 11/042,842 mailed Mar. 8, 2010.
Office Action dated Feb. 22, 2013 for U.S. Appl. No. 13/436,332, 12 pages.
Office Action dated Jun. 10, 2013 for U.S. Appl. No. 13/436,332, 29 pages.
Office Action dated Nov. 14, 2013 for U.S. Appl. No. 13/436,332, 12 pages.

* cited by examiner

MONITORING NETWORK TRAFFIC BY USING EVENT LOG INFORMATION

CROSS-REFERENCE TO RELATED APPLICATIONS

This application is a continuing-in-part application, which claims the benefit of U.S. patent application, entitled "Secure Enterprise Network", having Ser. No. 11/042,842 and a filing date of 25 Jan. 2005, which in turn claims the benefit of U.S. provisional patent application, entitled "Secure Enterprise Network," having Ser. No. 60/548,047 and the filing date of 26 Feb. 2004.

FIELD OF THE INVENTION

The present invention generally pertains to monitoring network traffic generated on a networked environment. More specifically, the present invention pertains to associating network packets according to a selected category, such as information related to a network entity identity, including a user name, group organization, user object, host name or other category used or defined in a networked environment, by using event log information maintained on the networked environment.

BACKGROUND OF THE INVENTION

The term "computer network" generally refers to a system for enabling communication between or among computers or equivalent computing devices. When configured to include a server providing a directory service, the computer network becomes an integrated distributed computing environment, hereinafter "networked environment", where authenticated computing devices and users of these devices can utilize network resources, such as by using or sharing data or attached peripherals, or communicate with each other. Communication on a networked environment is commonly achieved by using a "network packet," or sometimes simply referred to as a "packet." The term "network traffic" is commonly used to refer to either a single packet or collective group of packets that are traversing on the networked environment at a given moment.

Access to these network resources are typically governed by an authentication process. In the context of network security, authentication is a process of verifying the identity claimed by a network entity, such as a user, sometimes referred to as a real user, seeking access to the networked environment. Authentication typically includes requiring the real user to engage in a logon process by entering a user name and password on a computing device or equivalent network entity. The device will request credentials from an authentication service provided by the networked environment. If the authentication service successfully authenticates the submitted user name, it returns a session key which permits the real user to obtain access to network resources, including data, limited typically only by the security policy defined for that authenticated user name. This session key has a limited lifetime and usually remains valid until the authenticated user name is logged off by the real user employing the user name. In addition, network event logging may also be used to record information pertaining to certain events that occur on the networked environment, including for example, logon attempts, whether successful or not, made during the authentication of a user name, and logoff events.

However, the above approach for limiting and governing access to network resources to a networked environment has its limitations. Network logon authentication relies on a trusted computing concept. Once a user name is authenticated, that user name becomes a trusted network entity on the networked environment and has access to network resources, such as data, on the networked environment usually limited by only the security policy defined for that authenticated user name and the lifetime of the session key granted. Monitoring of the real user's activities on the networked environment after authentication is thus limited to network authentication event log information, which provides a limited amount of information that renders difficult any attempt to ascertain the real user's activities on the networked environment. Consequently, a need exists for monitoring network traffic, and more particularly, for associating certain packets according to a selected category, such as identity information, including user name, group id, organization unit, user object, host name or other category, by using event log information maintained on the networked environment.

BRIEF DESCRIPTION OF THE DRAWINGS

The accompanying drawings, which are incorporated in and form a part of this specification, illustrate embodiments of the present invention and, together with the description, serve to explain the principles of the invention.

DETAILED DESCRIPTION OF THE EMBODIMENTS OF THE INVENTION

Figure 1:
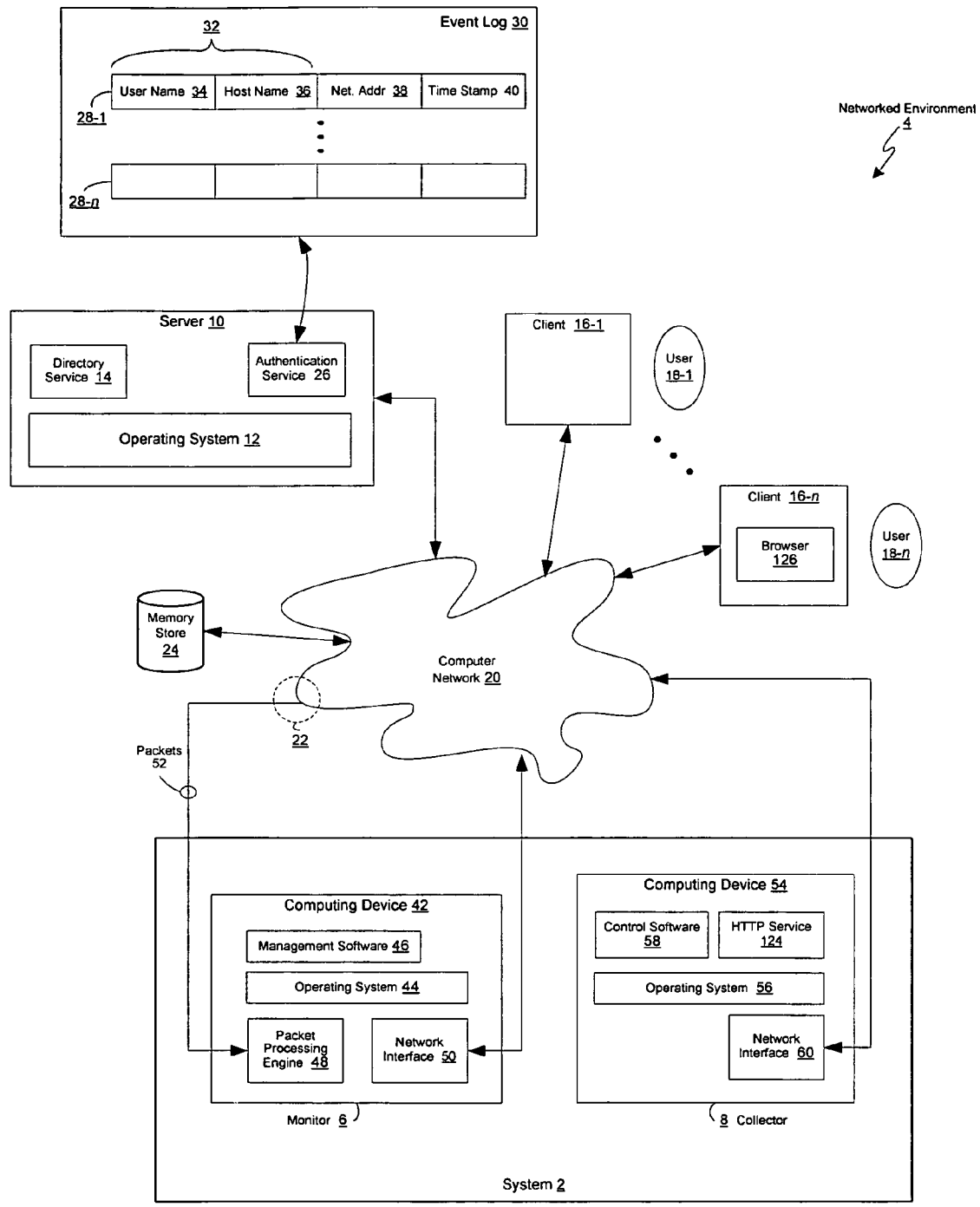
FIG. 1 is a block diagram of a system for associating certain packets according to a selected category, such as information related to a network entity identity, by using event log information in accordance with one embodiment of the present invention.

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having benefit of the herein disclosure.

In addition, for clarity purposes, not all of the routine features of the embodiments described herein are shown or described. It is appreciated that in the development of any such actual implementation, numerous implementation-specific decisions must be made to achieve the developer's specific goals. These specific goals will vary from one implementation to another and from one developer to another. Moreover, it will be appreciated that such a development effort might be complex and time-consuming but would nevertheless be a routine engineering undertaking for those of ordinary skill in the art having the benefit of the herein disclosure.

Element numbers are used throughout this disclosure, including the drawings. The variable "n" is used to indicate the total number of element instances, which may be equal to or greater than the number two.

The various embodiments of the present invention disclose a solution for monitoring network traffic on a networked environment by associating certain packets according to a selected category, such as information related to network entity identity, including user name, group, organizational unit, host name or other category, by using event log information maintained on the networked environment.

Associating network traffic according to a selected event item includes: receiving network traffic traversing on the networked environment; extracting a user name and a network address from an event log; identifying at least one packet from the received network traffic that contains a network address matching the extracted network address; and associating the identified packet(s) with the extracted user name. Further, once the identified packets are associated with the extracted user name, the extracted user name may be used to determine the network usage of a real user associated with the extracted user name.

In another embodiment of the present invention, the extracted user name is used as a category item within a set of category items that are utilized for associating with the identified packets. For example, the set of category items may further include, besides the extracted user name, a group id attribute and organizational unit attribute, which may be extracted from a user object that has a user name attribute matching the extracted user name. Since these additional items are part of the first set of category items and the first set of category items are associated with the identified packets, these additional items may also be used to determine the network usage of a real user associated with the extracted use name. For example, the identified packets, the first set of category items and the association established between them may be stored and maintained in a database, enabling any one or a combination of the items in the first set of category items to be used as a search term in a query to find the identified packets.

A time stamp, if logged and associated with the extracted user name and network address, may also be extracted from the event log and used as a category item for associating packets.

As shown in FIG. 1 and in accordance with an embodiment of the present invention, a system 2 for monitoring network traffic on a networked environment 4 by associating certain packets according to at least one selected category item obtained from a network authentication event log, and in an alternative embodiment, also obtained from a directory service. System 2 includes a monitor 6 and a collector 8, and is intended for use with a local area network, wide-area network or equivalent networked environment, such as networked environment 4. Networked environment 4 includes a server 10 having an operating system 12, and a software application, hereinafter directory service 14, that provides directory services to a plurality of computing devices, such as clients 16-1 through 16-n, and real users, such as real users 18-1 through 18-n. Clients 16-1 through 16-n and real users 18-1 through 18-n request and receive directory services from server 10 using a suitable computer network 20. Attachment point 22 and memory store 24 are also shown and may either be part of networked environment 4 or system 2.

Server 10 also includes a software application, herein after referred to as an authentication service 26, that authenticates network entities seeking to use networked environment 4, such as by seeking access to network resources, and that logs information, herein after referred to as "log entries", pertaining to network authentication-related activities that occur, such as user logon and logoff events, on network environment 4. Authentication service 26 stores these log entries, such as log entries 28-1 through 28-n, in an event log 30. For each log entry, such as log entry 28-1, authentication service 26 may include the identity 32 of a network entity, such as a user name 34 or hostname 36, used by the network entity that triggered the network authentication-related event, a network address 38 assigned to the network entity and a time stamp 40 reflecting the time in which the event occurred.

Authentication service 26 may be provided as a subset of services available from directory service 14 or as a separate software application on networked environment 4. For example, directory service 14 and authentication service 26 may be implemented by installing on server 10 the MICROSOFT® brand operation system, Windows 2003, which provides authentication and directory services through an integrated software application referred to as ACTIVE DIRECTORY. ACTIVE DIRECTORY is a LDAP-based directory service and like Windows 2003, is a product of Microsoft Corporation, of Redmond, Washington. ACTIVE DIRECTORY maintains an event log referred to as the security event log and may be used to obtain substantially the same information stored in event log 30.

Monitor

Monitor 6 may be implemented using a computing device 42 having at least an operating system 44 and a software application, hereinafter called management software 46, a system bus having at least one expansion slot (not shown) suitable for coupling to a packet processing engine 48, and a network interface 50 for coupling to collector 8 using networked environment 4 via computer network 20. Computing device 42 may be any computer having at least one CPU, a motherboard having system memory, a chipset for supporting the functions of the motherboard, user interfaces, such as keyboard, mouse, and monitor, and the system bus, and mass storage, such as a hard disk drive. The system bus may be any bus or interconnect, such as PCI, PCI-X, Hypertransport, PCI EXPRESS and the like, that is suitable for coupling to the packet processing engine selected, such as packet processing engine 48.

Network interface 50 may be any interface suitable for connecting to computer network 20. For example, if computer network 20 is implemented in the form of a packet-switched Ethernet network, then network interface 50 would be implemented using an Ethernet-compatible network interface card or equivalent. In another example, computer network 20 is implemented so that it complies with a cell relay network protocol, such as Asynchronous Transfer Mode (ATM) protocol, requiring a device, such as computing device 42, connected to computer network 20 to have a network interface, such as network interface 50, that is compatible with the cell relay network protocol or ATM protocol. The ATM protocol is commonly known by those of ordinary skill in the art.

Computing device 42 may be implemented using a motherboard having the model designation "X6DVA-EG" from SUPERMICRO Computer, Inc. of San Jose, Calif. Computing device may be configured with a single 3.60 GHz XEON processor, one gigabyte of system memory, an 80 GB hard disk drive, an Ethernet-compatible network interface, which is used to implement network interface 50, and an operating system in the form of LINUX®, version 2.4.28, available from www.kernel.org, which is maintained by the Kernel Dot Org Organization, Inc. of Palo Alto, Calif.

Packet Processing Engine

Packet processing engine 48 may be implemented using a packet processing engine that can receive and process, which includes inspecting and filtering, packets 52 received from attachment point 22, according to criteria specified by management software 46. In one embodiment of the present invention, packet processing engine 48 is implemented using a programmable packet processing engine having the model designation "ENP-2611 ", from RADISYS Corporation of Hillsboro, Oregon. In this implementation, packet processing engine 48 includes at least one Ethernet port (not shown) for attaching to and receiving packets from attachment port 22. Implementing packet processing engine 48 using model ENP-2611 is not intended to limit the present invention in any way.

One of ordinary skill in the art after receiving the benefit of the herein disclosure would readily recognize that other types of packet processing devices may be used that have the functionality disclosed herein. For example, a general purpose computer may be used alone or in conjunction with at least one network processor, Application Specific Integrated Circuits (ASICs), or a combination of these to provide the disclosed packet processing disclosed herein. Network processors are commonly known, such as the IXP2400 Network Processor, from INTEL Corporation, of Santa Clara, California. In another example, packet processing engine 48 may be replaced with a network interface (not shown) to receive packets 52 and program code operating on computing device 42 to process packets 52 as disclosed by the various embodiments of the present invention described herein.

Collector

Collector 8 may be implemented using a computing device 54 having at least an operating system 56, a software application, hereinafter referred to as control software 58 and a network interface 60 for connecting to networked environment 4 via computer network 20. Computing device 54 may be any computer having at least one CPU, a motherboard having system memory, a motherboard chipset, mass storage, such as a hard disk drive. For example, computing device 54 may be implemented using the model having the designation "Proliant Dual 140" from Hewlett-Packard of Palo Alto, Calif. The Proliant Dual 140 is configured with a single 3.60 GHz Xeon processor, one gigabyte of system memory, at least one PCI-x expansion slot, an 80 GB hard disk drive and an Ethernet-compatible network interface, which is used to implement network interface 60. In one embodiment of the present invention, computing device 54 operates using Red Hat Enterprise Linux® WS 2.1, available from Red Hat, Inc. of Raleigh, N.C.

In an alternative example of an embodiment of the present invention, collector 8 may include an additional network interface (not shown) which may be used to directly connect to network interface 50, enabling monitor 6 and collector 8 to communicate with each other without the use of networked environment 4.

Computing devices, such as computing device 42 and 54 are known, and thus, a detailed discussion of the hardware configuration of these computing devices is not provided to avoid over-complicating the herein discussion. Moreover, using two computing devices to implement monitor 6 and collector 8, respectively, is not intended to limit the present invention in any way. One of ordinary skill in the art would readily recognize that a single computing device (not shown) having sufficient processing bandwidth and expansion slots to support the functionality described herein may also be used.

Networked Environment

Networked environment 4 may be implemented using a client-server network application architecture, which is commonly known by those of ordinary skill in the art, and a computer network, such as computer network 20, having a topology and a physical media suitable for supporting the various embodiments disclosed herein, such as a computer network configured to have a packet-switched network topology using the TCP/IP protocol suite on twisted-pair copper physical media. Using a client-server network application architecture or twisted-pair copper media is not intended to be limiting in any way. One of ordinary skill in the art would readily recognize after receiving the benefit of the herein disclosure that other types of distributed network architectures and physical media may also be used. Further, other types of network protocols may be used in lieu of the TCP/IP protocol suite, including the OSI protocol or ATM protocol, which are commonly known networking protocols.

The various embodiments of the present invention disclosed herein are not limited to Windows® brand operating systems or to Active Directory. Other types of operating systems may be used, including UNIX, Linux®, BSD, and other UNIX variants, Solaris, Mac OS X, and the like. In addition, other types of software applications may be used instead of Active Directory to provide directory services. For example, one of ordinary skill in the art having the benefit of the herein disclosure would recognize that Sun Java Enterprise, available from Sun Microsystems, Inc., of Sunnyvale, Calif.; eDirectory, available from Novell, Inc. of Provo, Utah; and Red Hat Directory Server, available from Red Hat, Inc., Apache Directory Server, available from Apache Software Foundation of Forest Hill, Md., are exemplar directory services that may be used with the various embodiments of the present invention as described herein. Other directory services exist but are not listed to minimize over-complicating this herein disclosure. Further, Open-LDAP, the Kerberos network authentication protocol, hereinafter "Kerberos Protocol", and Samba software may be used to create the directory service functionality described for Active Directory.

The term "directory service" is intended to include a software application that complies with the X.500 standard, which is a commonly known standard developed by the ITU (International Telecommunication Union) and ISO (International Organization for Standardization). A LDAP-based directory service is commonly known and is based on the X.500 standard but uses the TCP/IP protocol. The term "LDAP" is also commonly known and is an acronym for Light Weight Directory Protocol, which is a networking protocol for querying, searching, and modifying directory services running over TCP/IP. LDAP is defined in terms of the Abstract Syntax Notation one, also referred to as ASN.

1, which is a joint standard managed by ISO, and the ITU-T (ITU Telecommunication Standardization Sector). ASN. 1 is a standard notation for describing data structures used for representing, encoding, transmitting and decoding data. LDAP is suitable for accessing an X.500 standard-compliant directory service, such as Active Directory.

A directory service is typically used to define, manage and authenticate network entities, such as computing devices, services and real users. Each network entity is treated as an object by the directory service. Each object has a unique name and a set of attributes, and represents a single network entity, such as a user, a computer, a printer, an application, or a shared data source and their respective attributes ("object attributes"). A directory service, such as Active Directory, creates and manages these objects using a hierarchical framework. This framework arranges objects into three broad categories: resources, such as printers; services and people, such as users and groups. A directory service manages these objects by enabling information to be read from or written to the objects, controlling access to the objects and enforcing security policies defined for the objects. This framework may include arranging these objects to belong to a domain. A directory service, such as Active directory, manages the domain in a "namespace" using its DNS name structure. The objects held within a domain can be grouped into containers called, "organizational units". The organizational unit is one level to apply group policies, called group policy objects in Active Directory.

Figure 2:
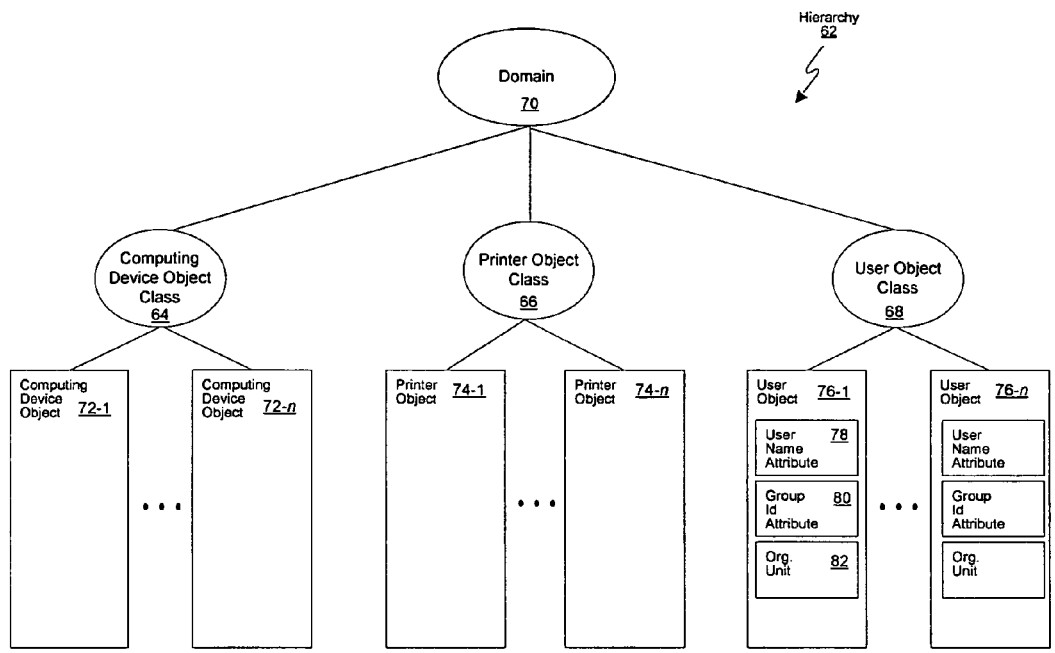
FIG. 2 is a block diagram of an example directory hierarchy in accordance with another embodiment of the present invention.

Turning now to FIG. 2, directory service 14 in FIG. 1 may have a hierarchy 62 organized according to a selected manner by a system administrator of networked environment 4. Each object in the directory service is typically uniquely identified in the directory and uniquely named for a given namespace, such as a domain. Each object is of a particular object class. For example, hierarchy 62 may include a computing device object class 64, a printer object class 66 and a user object class 68 in a domain 70. Computer objects 72-1 through 72-n represent computing devices, such as clients 16-1 through 16-n, respectively, and belong to computing device object class 64, while printer objects 66-1 through 66-n may represent printers and belong to printer object class 66. Further still, user objects 76-1 through 76-n may represent real users, such as real users 18-1 through 18-n, respectively, and belong to user object class 68.

Each object may have more than one attribute, and each attribute may contain a value. Object attributes define the characteristics of and information related to the entity represented by the object containing the object attributes. For example, a set of attributes defined in user object 76-1 may include user information related to a real user, such as user name attribute 78, group id attribute 80 and organizational unit attribute 82. User name attribute 78 may be in the form of an email address that has a suffix portion that includes the domain name established for the networked environment and a prefix portion that is unique to the real user. For example, in one embodiment of the present invention, a user name of: "jdoe@packetmotion.com" may be used for real user 18-1. In Active Directory, the user name attribute in a user object is referred to as the "UserPrincipalName" attribute and requires a value that has an e-mail address format, such as the format disclosed in the example above.

A directory service stores objects in a database, or equivalent memory store, according to a selected model, referred to as a schema. The collection of objects stored in the database is sometimes referred to as a directory. The directory service functions as an interface to the database and provides access to objects stored in the database. Access to the directory service may be accomplished using LDAP.

Figure 3:
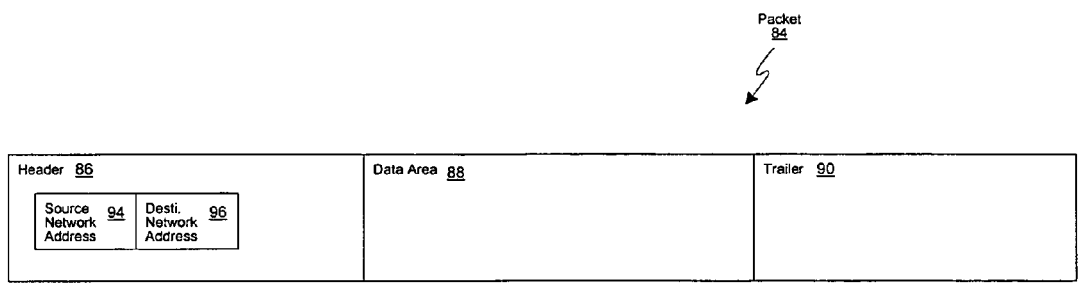
FIG. 3 is a block diagram of an example packet in accordance with another embodiment of the present invention.

The term "network packet" or alternatively, "packet" is intended to mean the basic unit in which data is transmitted on a packet switched network, such as networked environment 4. As shown in FIG. 3, a typical packet 84 consists of three main elements: a header 86, a data area 88 and a trailer 90. Header 86 includes information describing the source and destination of the packet. The source of the packet is in the form of a network address of the network entity that created the packet and may be referred to as a source network address. The destination of the packet is in the form of a network address of the intended network entity recipient of the packet and may be referred to as a destination network address. Example source network address 94 and destination network address 96 are illustrated in FIG. 3 in block diagram form. Data area 88, sometimes referred to as the "payload," contains the data intended to be transmitted by the network entity.

Referring again to FIG. 1, computer network 20 enables computing devices to connect and communicate with other devices that are also coupled to networked environment 4. Computer network 20 may be implemented using any physical media that can support the transmission protocol used in networked environment 4. In addition, various types of physical media may be used instead of twisted pair copper physical media, including fiber, coax, wireless, and the like.

Attachment point 22 may be implemented using a network tap or a switch having spanning port or mirror port functionality, which are commonly known. A network tap is typically installed on a computer network segment, such as between two switches on a packet-switched network topology, and either splits or regenerates the packets transmitted through the segment, creating a duplicate set of packets, such as packets 52, that may then be sent to a connected device. A switch having a mirror port typically indicates that the switch can copy packets received in one standard switch port and to another switch port, which is referred to as a "mirror" port. Unlike standard switch ports, a mirror port cannot support bidirectional traffic and can only transmit the copied or duplicated packets to connected device. A switch having a spanning port typically indicates that the switch can copy packets received from all standard switch ports available on the switch to a single spanning port. Unlike standard switch ports, a spanning port cannot support bidirectional traffic and can only transmit the copied or duplicated packets to a connected device. In FIG. 1, monitor 6 functions as the connected device receiving the duplicated packets in the above example. It is contemplated that attachment point 22 is strategically placed on computer network 20 so that network traffic transmitted on computer network is duplicated and transmitted to monitor 6. For example, if attachment point 22 is implemented using a switch having a spanning port (not shown), the standard switch ports of the switch either directly or indirectly connect to all computer network segments that comprise computer network 20.

The term "client" includes any computing device that can request and use application functionality, such as directory services, provided by a server, such as server 10, operating on networked environment. The term "computing device" includes any device, such as a general purpose general, server, hand-held device or the like, that includes an operating system, a network interface compatible with computer network 20, and capable of executing application programs or program code. The term "server" is a subset of computing devices and primarily provides application functionality to another device connecting or connected to networked environment 4. Such application functionality may include directory services, mass storage services, e-mail services, web services, and other functionality. The term "node" includes any computing device, such as system 2, clients 16-1 through 16-n, server 10 and memory store 24, operating on a networked environment, such as networked environment 4 and using a unique network address that was previously granted to the node either manually or automatically, such as through a DHCP, also known as Dynamic Host Configuration Protocol, service (not shown). DHCP services are commonly known.

Server 10 may be implemented using any computer device sufficient to support the server's planned function, such as software-based service applications that include a directory service, e-mail, file system and the like. Page 17

The term "memory store" is intended to include any device, such as a storage server, that is capable of providing at least read and write functionality to a requesting computing device, such as for example, system 2, clients 16-1 through 16-n and server 10. In accordance with one embodiment of the present invention, memory store 24 is implemented using any database server capable of communicating with another computing device on networked environment 4 using the SOAP protocol. For example, memory store 24 may be implemented using a database application, such as ORACLE, configured to operate on database server, such as the database server having model designation Oracle 9G, available form Oracle Corporation of Redwood City, Calif.

The SOAP protocol is commonly known and a protocol for exchanging XML-based messages over a computer network, such as computer network 20. HTTP (hypertext transfer protocol) and the XML language (extensible markup language) are also commonly known. The World Wide Web Consortium commonly referred to as W3C, currently maintain the specifications for SOAP and HTTP. Collector 8 operating under control software 58; sends a request message to another node, such as memory store 24, which replies with an appropriate response message to collector 8.

The use of a database server to implement memory store 24 is not intended to limit the scope and spirit of the various embodiments of the present invention disclosed here. One of ordinary skill in the art after receiving the benefit of the herein disclosure would readily recognize that memory store 24 may be implemented on a separate network, such as on a Storage Area Network, commonly referred to as a SAN, implemented using a network attached storage (NAS) device, or implemented using computing device 54 configured with a database application software and a mass storage device, such as hard disk drive or a mass storage array in either a JBOD (Just a Bunch of Disks) or RAID (Redundant Array of Independent Disks) configuration.

Management Software and Control Software

Management software and control software are implemented in a selected programming language, such as C# or Java, and compiled for their target operating system, which for both applications in the example shown in FIG. 1, is the Linux® operating system. During operation, management software 46 executes on computing device 42 and communicates with packet processing engine 48 and control software 58. Control software 58 executes on computing device 54 and communicates with management software 46 and a server running a directory service, such as server 10 and directory service 14, respectively. Management software 46 communicates with packet processing engine 48 using a set of Application Program Interfaces (APIs), such as the programming and runtime libraries specific to the ENP-2611 packet processing engine.

Both management software 46 and control software 58 use the SOAP protocol, version 1.2, over HTTP to communicate with each other through network interfaces 50 and 60, respectively. Although network interfaces 50 and 60 are coupled to each other using computer network 20 of networked environment 4, other approaches may be used, such as by coupling network interfaces 50 and 60 directly using a separate physical medium, eliminating the need to use networked environment 4.

In addition, control software 58 obtains an event log from an authentication service on networked environment 4, such as event log 30 and authentication service 26, respectively. Obtaining event log 30 provides control software 58 with at least one category item that can be used for associating packets from network traffic traversing on networked environment 4. For example, event log 30 may include log entries 28-1 through 28-n. Each log entry, such as log entry 28-1, contains a user name and network address, such as user name 34 and network address 38, respectively, that were used by a real user, such as real user 18-1, during a network authentication-related transaction that was recorded in event log 30 by authentication service 26. Control software 58 may also obtain a time stamp, such as time stamp 40, associated with the user name and network address retrieved from event log 30. The user name, network address and time stamp extracted from the same log entry are hereinafter referred to as an "extracted user name", "extracted network address", and "extracted time stamp", respectively.

The manner of obtaining the data from event log 30 depends on the type of software used to create and maintain event log 30. For example, if an authentication service 26 is used to create and maintain event log 30, and is implemented using a Microsoft brand operating system, such as Microsoft Windows Server 2003, that provides the Active Directory software application, then control software 58 includes program code that uses the SMB protocol to obtain event log 30 from authentication service 26. The SMB, which is an acronym for Server Message Block, protocol is commonly known and a network protocol that supports the sharing of data, files, resources and permits authenticated inter-process communication between computing devices that use a Microsoft Windows-based operating system in a networked environment. For example, SAMBA includes an open source implementation of the SMB protocol and thus, may be used to retrieve security event logs from a directory service implemented using Microsoft Active Directory.

The use of Active Directory to implement authentication service is not intended to be limiting in any way. Other types of authentication services may be used, such as eDirectory, available from Novel. The eDirectory software application is intended for use with Linux-based operating systems and can be used to provide an authentication service that creates and maintains an event log that event information substantially similar to those logged in event log 30. If event log 30 is created and managed using eDirectory or a similar Linux-based software application, then control software 58 includes program code that uses the syslog protocol, which is commonly known, to extract event items from the event log maintained by the authentication service provided under eDirectory.

In another alternate embodiment, a software agent may be deployed on server 10 and used to provide event log 30 to control software 58. This software agent uses the appropriate protocol supported by the type of authentication service and event log used to log event information on networked environment 4 and by control software 58, including the SMB or syslog protocol.

After obtaining at least one category item, such as an extracted user name, and an extracted network address, and in accordance with a further embodiment of the present invention, control software 58 also obtains additional category items related to the extracted user name by using the LDAP protocol to communicate with directory service 14. These additional category items include a group id attribute and organizational id attribute from a user object having a user name attribute that matches the extracted user name, such as user name 34. The use of the LDAP protocol is not intended to limit the scope and spirit of the various embodiments of the present invention disclosed herein. Other protocols may be used as long as the protocol selected is compatible with the type of directory service and authentication service implemented on networked environment 4.

Further, control software 58 may obtain more than one set of category items, providing system 2 with more than one set of category items that may be used to associate network packets. The term "set of category items" is hereinafter also referred to as a "category set". Each category set includes at least a user name category item for storing an extracted user name, an extracted network address obtained from the same log entry as the extracted user name, a group id category item for storing a group id attribute, an organizational unit category item for storing an organizational unit attribute, and if applicable, a time stamp category item for storing a time stamp, if the time stamp was previously extracted with the extracted user name stored in the same category set. The group id and organizational unit attributes stored in a category set are obtained from a user object having a user name attribute that matches the extracted user name stored in the category set. Control software 58 also associates a unique index to each category set.

Figure 4:
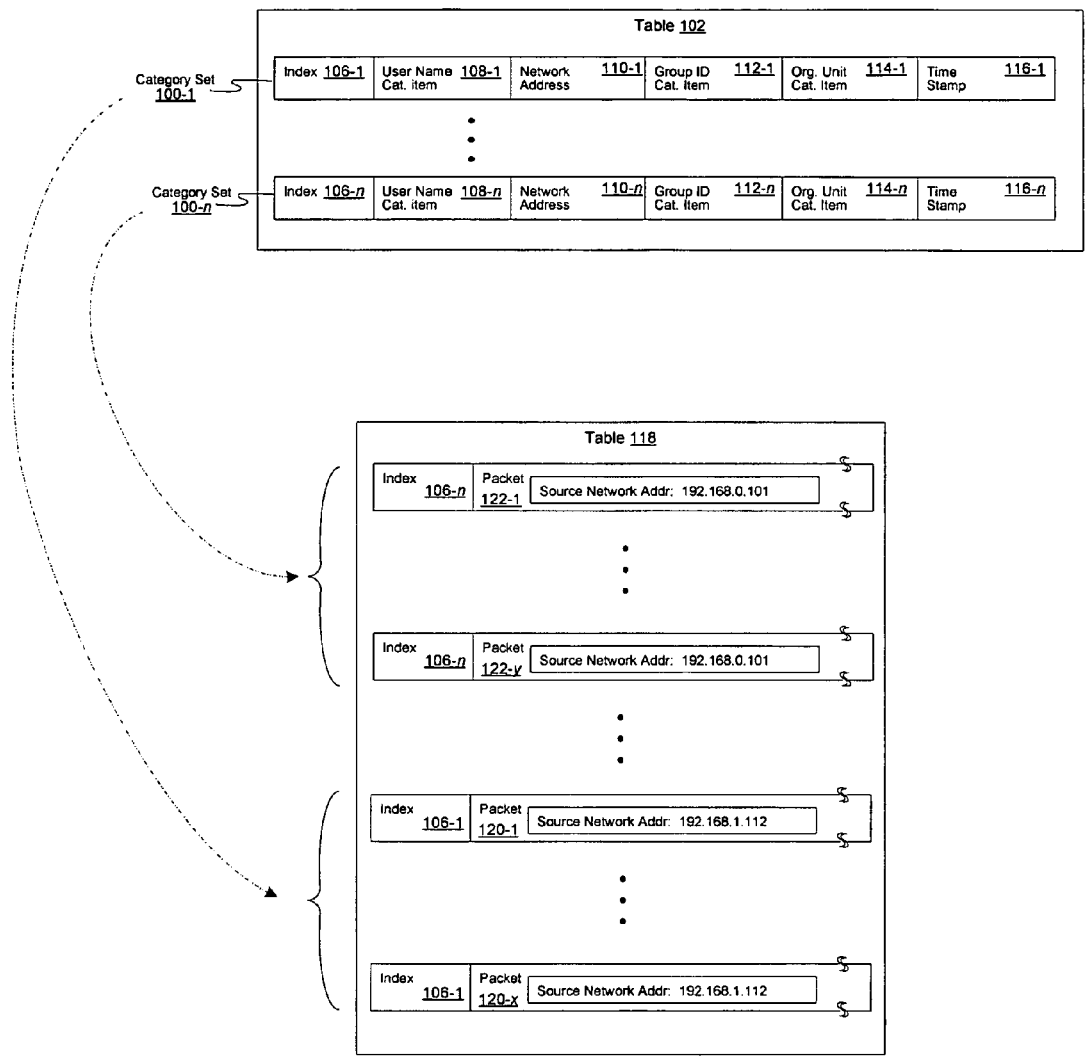
FIG. 4 is a block diagram of example tables for storing user object attributes and packets that are associated with the user object attributes in accordance with yet another embodiment of the present invention.

For example, as shown in FIG. 4, control software 58 stores each category set, such as category sets 100-1 through 100-*n*, in memory store 24 in a suitable form, such as in a table 102 defined in a database 104; and respectively associates indices 106-1 through 106-*n* with category sets 100-1 through 100-*n*, where n represents the total number of category sets stored in table 102. Control software 58 uses the SOAP protocol and an appropriate database abstraction layer necessary to communicate with the type of database selected, such as Torque or JDBC, which are commonly known.

Category set 100-1 includes a user name category item 108-1; a network address 110-1, a group id category item 112-1; an organizational unit category item 114-1; and if applicable, a time stamp category item 116-1. Similarly, category set 100-*n* may include a user name category item 108-*n*, a network address 110-*n*, a group id category item 112-*n*, an organizational unit category item 114-*n*; and if applicable, a time stamp category item 116-*n*, where n represents the total number of category sets stored in table 102.

Control software 58 also obtains network traffic traversing on network environment 4, by instructing monitor 6, which is under program control of management software 46, to receive packets, such as packets 52 in FIG. 1, from networked environment 4 and to forward these packets to collector 8. Monitor 6 receives packets 52 from an attachment point, such as attachment point 22. In response to receiving the above request from control software 58, management software 46 will cause packet processing engine 30 to assert the proper signals on the expansion bus of computing device 24 so that monitor 6 can receive the packets and forward them to collector 8 operating under program control of control software 58. Management software 46 and control software 58 communicate using the SOAP protocol although the use of this protocol is not intended to limit the scope and spirit of the various embodiments of the present invention.

Upon receiving packets 52 from monitor 6, control software 58 stores the packets in a table 118 and identifies packets having a network address that matches an extracted network address stored in a category set in table 102. For each packet that is identified to have a matching network address, control software 58 associates a unique index, such as index 106-1, which was previously assigned to a category set having an extracted network address, to packets that have a network address matching the extracted network address. Since each category set has a unique index and includes a category set related to the identity of a network entity, such as the user name of a real user, network traffic generated by the network entity can be monitored because packets comprising that network traffic can be associated with the user name of that network entity using table 202.

For example, as seen in FIG. 4, packets received from monitor 6 may include packets having a source network address of 192.168.1.112, such as packets 120-1 through 120-*x* stored in Table 118, where x represents the number of packets having a source network address of 192.168.1.112. The type of network address held by a packet is not intended to limit the invention in any way. A source network address or destination network address may be used to match packets with a category set. In this example, category set 100-1 includes an extracted network address of 192.168.1.112, consequently control software 58 also applies index 106-1 to packets 120-1 through 120-*x*, creating an association between category set 100-1 and packets 120-1 through 120-*x*.

In another example, the packets received from monitor 6 may also include packets having a source network address of 192.168.0.101, such as packets 122-1 through 122-*y*, where y represents the number of packets having a source network address of 192.168.0.101. The type of network address held by a packet is not intended to limit the invention in any way. A source network address, destination network address or both may be used to match packets with a category sets. In this example, category set 100-*n* includes an extracted network address of 192.168.0.101, thus control software 58 applies index 106-*n* to packets 122-1 through 122-*y*, creating an association between category set 100-*n* and packets 122-1 through 122-*y*. By providing an association between or among packets traversing on a networked environment and selected user information, such as user name, group id, organizational unit or any combination of these, an administrator of system 2 can monitor the network traffic generated by a real user that corresponds to the selected user information or category.

In accordance with another embodiment of the present invention, if extracted time stamps are included in the category sets stored in table 102, control software 58 may also require any packets identified to have a network address matching an extracted network address stored in one of the category sets to also have a time stamp that is equal or a later than the extracted time stamp stored in the category set with the matching extracted network address.

Collector 8, as seen in FIG. 1, may also be configured to include a HTTP software application that provides a HTTP service 124. Control software 58 uses HTTP service 124 to provide access to table 102 and table 118 to any computing device, such as client 16-1, on networked environment 4 having a HTTP-compatible browser 126, such as Mozilla Firefox or Internet Explorer. HTTP services and HTTP-compatible browsers are commonly known.

Figure 5:
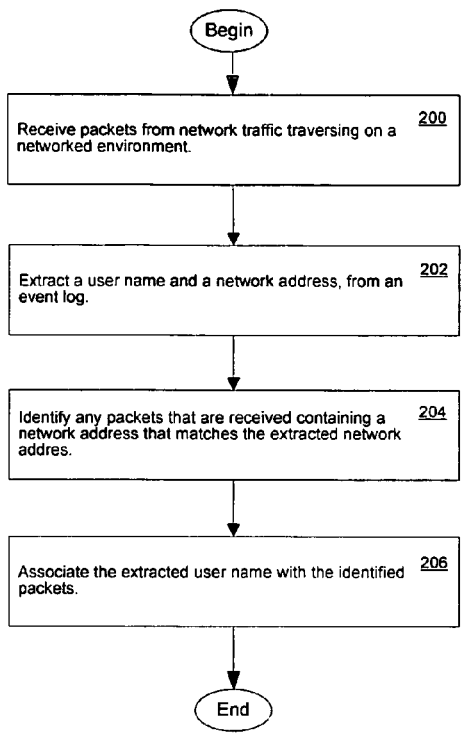
FIG. 5 is a block diagram flow of an example method for associating certain packets according to a selected category by using event log information in accordance with yet another embodiment of the present invention.

In conjunction with FIG. 1, FIG. 5 discloses a method for associating network packets according to a selected category, such as information related to network entity identity, including a user name, group id attribute, organization unit attribute, or other category used or defined in a networked environment, by using event log information maintained on the networked environment in accordance with another embodiment of the present invention.

It is contemplated that the method includes using a system, such as system 2, on a networked environment having an authentication service and a directory service, such as networked environment 4, authentication service 26 and directory service 14, respectively.

Packets from network traffic traversing on the networked environment are received 200, such as packets 52, from attachment point 22.

A user name and a network address are extracted 202 from an event log, such as event log 30. The event log may be obtained from an authentication service, such as authentication service 26. Extracting 202 a user name and network address from an event log may also include obtaining (not shown) additional log data associated with the extracted user name and network address, such as a time stamp.

Any packet received containing a network address that matches the extracted network address is identified 204. Identifying 204 a packet may also include requiring that any identified packet also contain a time stamp that is equal or a later than the extracted time stamp, if the extracted time stamp was previously extracted.

The extracted user name is associated 206 with the identified packets. This association may be accomplished by assigning a unique index to the identified packets and the extracted user name and if desired, by storing the unique index, extracted user name and the identified packets in a suitable memory store or database for later retrieval, analysis or both.

Figure 6:
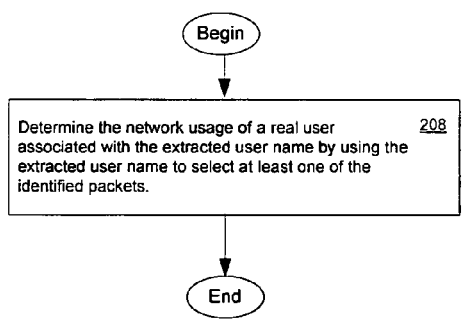
FIG. 6 is a block diagram flow for improving the example method shown in FIG. 5 in accordance with yet another further embodiment of the present invention.

As shown in FIG. 6, the embodiment of the present invention shown in FIG. 5 may be further improved if the network usage of a real user associated with the extracted user name is determined 208 by using the extracted user name to select at least one of the identified packets.

Figure 7:
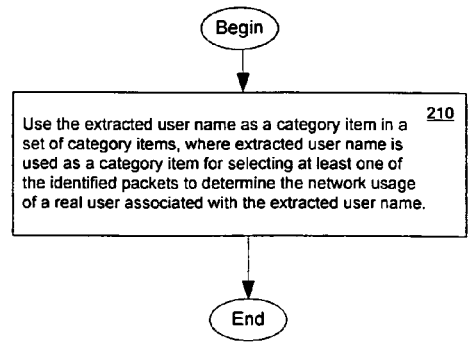
FIG. 7 is a block diagram flow for improving the example method shown in FIG. 5 in accordance with further still another embodiment of the present invention.

As shown in FIG. 7, the embodiment of the present invention shown in FIG. 5 may further be improved if the extracted user name is used 210 as a category item in a set of category items, where the extracted user name is used as a category item for selecting at least one of the identified packets to determine the network usage of a real user associated with the extracted user name.

Figure 8:
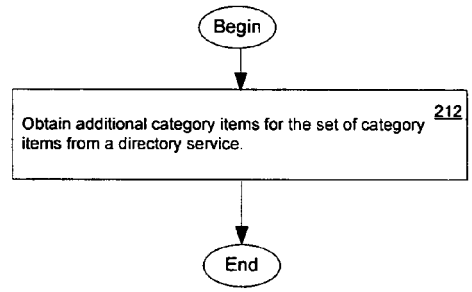
FIG. 8 is a block diagram flow for improving the example method shown in FIG. 7 in accordance with yet another embodiment of the present invention.

As shown in FIG. 8, the embodiment of the present invention shown in FIG. 7 may be further improved if additional category items for the set of category items are obtained 212 from a directory service, such as directory service 14, provided on the networked environment. These additional category items may include a group id attribute and an organizational unit attribute, which are obtained from a user object having a user name attribute matching the extracted user.

The method disclosed in FIG. 6 is not intended to be limited to the order listed but may be implemented in any order sufficient to successfully perform the method. In addition, one of ordinary skill in the art would readily recognize after receiving the benefit of the herein disclosure that more than one set of event items and category items may be used.

While the present invention has been described in particular embodiments, it should be appreciated that the present invention should not be construed as limited by such embodiments. Rather, the present invention should be construed according to the claims below.

What is claimed is:

1. A computer implemented method comprising:
   receiving, by a first computing device via a first network, an event log from an authentication service that authorizes user access to resources on the first network, the event log including an event authorizing access to the resources on the first network;
   receiving, by a second computing device, the event log from the first computing device over a second network, the second network enabling the first computing device and the second computing device to communicate without using the first network;
   extracting, by the second computing device, a first user name, a time stamp, and a first network address from an authenticated-related event portion of the event log;
   receiving, by the first computing device, network traffic from the first network;
   identifying, by the second computing device, at least one packet from the network traffic that contains a second network address matching the first network address;
   identifying, by the second computing device, a time stamp within the network packet;
   determining that the time stamp within the network packet is equal to or later than the time stamp from the authenticated-related event portion of the event log; and
   based on the determining, associating, by the second computing device, the at least one packet with the first user name.

2. The method of claim 1 wherein the first user name is used to select the at least one packet to determine the network usage of a real user associated with the first user name.

3. The method of claim 1, further comprising using the first user name as a category item in a first set of category items; and wherein the first user name is used for selecting the at least one packet to determine the network usage of a real user associated with the first user name.

4. The method of claim 3, further comprising extracting a second user name and a third network address.

5. The method of claim 4, further comprising:
   identifying at least one packet from the network traffic that contains a fourth network address matching the third network address; and
   associating the at least one packet that contains the fourth network address with the second user name.

6. The method of claim 5, further comprising:
   using the second user name as a category item in a second set of category items; and
   wherein the second user name is used for selecting the at least one packet that contains the fourth network address to determine the network usage of a real user associated with the second user name.

7. The method of claim 1, further comprising obtaining additional category items for the first set of category items from a directory service provided on the networked environment, the additional category items comprising a group id attribute and an organizational unit attribute from a user object having a user name attribute matching the first user name.

8. A system comprising:
a first network;
a first computing device comprising a monitor configured to receive network traffic from the first network, the monitor coupled to an authentication service by the first network, the authentication service logging network authentication-related events, including network logon and logoff events, in an event log during an occurrence of a network authentication-related event; and
a second computing device comprising a collector in communication with the monitor, the collector being configured to receive an event log from the monitor and extract a first user name, a time stamp, and a first network address from an authenticated-related event portion of the event log received from the monitor;
wherein the monitor is further configured to monitor the received network traffic on the first network;
wherein the collector is further configured to:
identify at least one packet from the network traffic that contains a second network address matching the first network address;
identify a time stamp within the network packet;
determine that the time stamp within the network packet is equal to or later than the time stamp from the authenticated-related event portion of the event log; and
based on the determining, associate the at least one packet with the first user name.

9. The system of claim 8, wherein the collector is further configured to use the first user name to select the at least one packet to determine the network usage of a real user associated with the first user name.

10. The system of claim 8, wherein the collector is further configured to use the first user name as a category item in a first set of category items, and the collector is further configured to use the first user name to select the at least one packet to determine the network usage of a real user associated with the first user name.

11. The system of claim 10, wherein the collector is further configured to extract a second user name and a third network address.

12. The system of claim 10, wherein the collector is further configured to obtain additional category items for the first set of category items from a directory service provided on the networked environment, the additional category items including a group id attribute and an organizational unit attribute from a user object having a user name attribute matching the first user name.

13. The system of claim 10, further comprising a database for storing the first set of category items.

14. The system of claim 13 further comprising a hypertext transfer protocol (HTTP) server for enabling queries to be performed on the database from a HTTP-enabled browser application executing on a computer.

15. The system of claim 8, wherein the monitor comprises a packet processing engine and a network interface; and wherein the packet processing engine and network interface are coupled to the networked environment.

16. A computer program embodied on at least one non-transitory computer-readable medium for executing a method, the method comprising:
receiving, by a monitor module, via a first network, an event log from an authentication service that authorizes user access to resources on the first network, the event log including an event authorizing access to the resources on the first network;
receiving, by a collector module, the event log from the monitor module over a second network, the second network enabling the collector module and the monitor module to communicate without using the first network;
extracting, by the collector module, a first user name, a time stamp, and a first network address from the event log;
receiving, by the monitor module, network traffic from the first network;
identifying, by the collector module, at least one packet from the network traffic that contains a second network address matching the first network address;
identifying, by the collector module, a time stamp within the network packet;
determining, by the collector module, that the time stamp within the network packet is equal to or later than the time stamp from the event log; and
based on the determining, associating, by the collector module, the at least one packet with the first user name.

17. The computer-readable medium of claim 16, wherein the method further comprises using the first user name to select the at least one packet to determine the network usage of a real user associated with the first user name.

18. The computer-readable medium of claim 16, the method further comprising using the first user name as a category item in a first set of category items; and wherein the first user name is used for selecting the at least one packet to determine the network usage of a real user associated with the first user name.

19. The computer-readable medium of claim 18, the method further comprising extracting a second user name and a third network address.

20. The computer-readable medium of claim 19, the method further comprising:
identifying at least one packet from the network traffic that contains a fourth network address matching the third network address; and
associating the at least one packet that contains the fourth network address with the second user name.

21. The computer-readable medium of claim 20, the method further comprising using the second user name as a category item in a second set of category items; and wherein the second user name is used for selecting the at least one packet that contains the fourth network address to determine the network usage of a real user associated with the second user name.

22. The computer-readable medium of claim 16, the method further comprising storing the first user name, the time stamp, and the first network address associated with the event log separately from the time stamp and second network address associated with the at least one packet for later access.

* * * * *